3,247,252
β-DIALKYLAMINOETHYLAMINO-TRIPHENYL-
ETHANOLS, -ETHANES, AND -ETHENES
Frank P. Palopoli, Cincinnati, and Vernon J. Feil, Glendale, Ohio, assignors to Richardson-Merrell Inc., New York, N.Y., a corporation of Delaware
No Drawing. Filed Nov. 14, 1962, Ser. No. 237,722
13 Claims. (Cl. 260—570)

This invention relates to new chemical compounds which are derivatives of triphenylethanes. They are distinguished by their anti-estrogenic, anti-inflammatory, and anti-gonadotrophic activities. Some of these compounds posses various combinations of these activities.

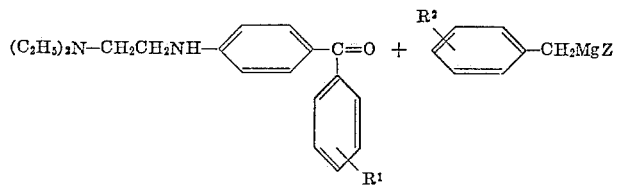

Compounds of the present invention correspond to the formula:

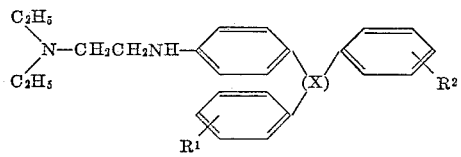

wherein $R^1$ and $R^2$ are selected from the group consisting of hydrogen, halogen, lower alkyl, lower alkoxy, and trifluoromethyl, with the proviso that at least one of $R^1$ and $R^2$ is other than hydrogen; and X is selected from the group consisting of ethanol

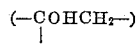

ethylene

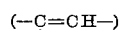

and ethane

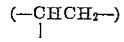

radicals.

Among the groups representative of $R^1$ and $R^2$ are hydrogen, chloride, bromine, fluorine, methyl, ethyl, propyl, butyl, isobutyl, methoxy, ethoxy, propoxy, butoxy, trifluoromethyl, and the like. The alkyl groups generally contain between one and about four carbon atoms.

The compounds of this invention are more specifically characterized by the following formulas:

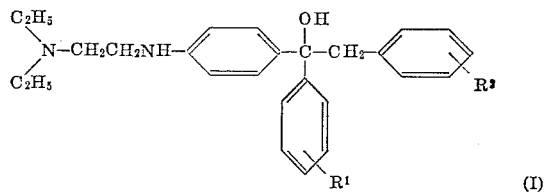

(I)

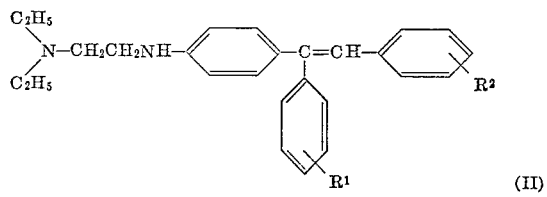

(II)

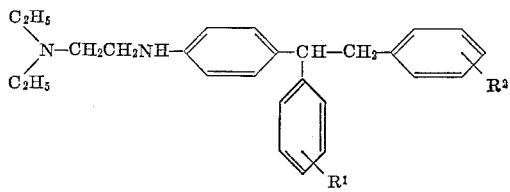

(III)

The novel ethanol compounds of this invention can be prepared by reacting a substituted benzylmagnesium halide with an appropriate β-diethylaminoethylamino substituted benzophenone derivative. The following reaction scheme is illustrative of the preparation of the ethanol derivatives:

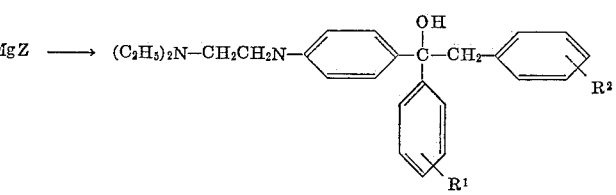

wherein $R^1$ and $R^2$ are as described above and Z is chlorine or bromine.

The ethylene derivatives of the present invention are readily prepared by dehydration of the ethanol compounds in the presence of strong acids such as hydrochloric acid, hydrobromic acid, p-toluenesulfonic acid, and the like.

The ethane derivatives of the present invention are prepared by catalytic hydrogenation of the ethylene compounds in the presence of a suitable catalyst such as platinum oxide or palladium-on-charcoal.

The reaction of a benzylmagnesium halide or of a substituted benzylmagnesium halide with the ketone is usually carried out at room temperature or slightly above in an anhydrous ether solvent. These reactions are also operative at lower temperatures, for example to —20° C., and also at higher temperatures, to about 150° C. These temperatures may be achieved by cooling the reaction mixture or by use of a higher boiling solvent, such as tetrahydrofuran (boiling point 65 to 66° C.) or di-n-butyl ether (boiling point 142° C.). Another method generally used to achieve higher reaction temperatures is the preparation of the Grignard reagent in the usual manner in diethyl ether and then replacing the ether with a hydrocarbon solvent, such as benzene (boiling point 80° C.) or toluene (boiling point 110° C.) for the subsequent reaction of the Grignard reagent with the ketone. Grignard reactions have also been successfully carried out in tertiary amine solvents, such as dimethylaniline (boiling point 193° C.) and N-alkylmorpholines.

The dehydration of the ethanols to produce the ethylenes also can be achieved by a number of procedures. Both mineral and organic acids or anhydrides may be used to effect dehydration. For example, aqueous hydrochloric acid, alcoholic hydrogen chloride, phosphoric acid, p-toluenesulfonic acid, oxalic acid, or acetic anhydride may be used to effect dehydration. The temperatures at which the dehydration occurs would be dependent on the compound involved and the solvent system or the agent used to effect the dehydration, i.e., alcoholic hydrogen chloride at about 75° C., or aqueous hydrochloric acid from room temperature to the refluxing temperature of about 100° C. In acetic acid or acetic anhydride, any temperature up to the boiling point of the solvent (dehydrating agent) could be used. Alternatively, the solid ethanol could be mixed with oxalic acid or toluenesulfonic acid and heated to a melt (ca. 180° C.).

The hydrogenation of the ethylenes to the corresponding ethanes can be carried out in alcoholic and aqueous alcoholic solutions, acetic acid and dilute acetic acid solutions, or dimethylformamide or other inert organic solvents. Hydrogenation is usually accomplished under low pressures, i.e., about 50 to 60 p.s.i. over platinum oxide or a palladium-on-charcoal catalyst. Hydrogenation temperatures may vary from room temperature to about 100° C., depending on the solvent utilized in the reaction.

As estrogen antagonists, the compounds are useful in the treatment of hyperestrogenism and disorders related to this condition, e.g., endometriosis, functional bleeding, Kleinfelter's syndrome, dysmenorrhea, menopausal dysfunction, and similar conditions. They are active both orally and parenterally and so can be administered by either route, though the oral route is preferred in most instances. Some of the compounds have a high degree of activity as estrogen antagonists. Some of the compounds with anti-estrogenic activity are also uterotrophic.

As anti-inflammatory agents, the compounds are useful in alleviating the symptoms of such collagen diseases as arthritis and rheumatism and in the topical treatment of inflammation. Some of the compounds possess the novel combination of anti-inflammatory and anti-estrogenic activities and are especially advantageous for this reason.

As gonadotrophin inhibition agents, the compounds are useful for the treatment of fertility and sterility problems and can be administered orally or parenterally for this purpose.

Generally the compounds can be used orally and parenterally in doses ranging between 25 milligrams and 2 to 4 grams daily, depending on the condition under treatment. For topical use the compounds can be incorporated into creams, ointments, or lotions in concentrations of up to 10 percent. In aerosol sprays the concentration can be in the order of about 0.05 to 1 percent. The compounds can be isolated and are generally useful in the form of their salts with mineral acids, such as hydrochloric or hydrobromic acid, or with organic acids such as citric, oxalic, or the like. The compounds can also be used in the free base form.

The following examples illustrate specific embodiments of the present invention.

*Example I.—1-[p-(β-diethylaminoethylamino)phenyl]-1-(p-tolyl)-2-(p-chlorophenyl)ethanol*

An ether solution containing 20 grams (0.064 mole) of p-(β-diethylaminoethylamino) - p'-methylbenzophenone was added to an ether solution of p-chlorobenzyl-magnesium chloride (prepared from 32.2 grams (0.2 mole) of p-chlorobenzyl chloride and 12 grams of magnesium turnings). A sufficient quantity of tetrahydrofuran was added to dissolve the complex, and the solution was refluxed for one hour. The reaction mixture was then poured into a cold ammonium chloride solution, and the organic layer was separated. The solvents were removed by distillation and the resulting oil was crystallized from aqueous methanol. The solid was recrystallized from diethyl ether to yield 1-[p-(β-diethylaminoethylamino)-phenyl]-1-(p-tolyl) - 2 - (p-chlorophenyl)ethanol, melting at 126 to 128° C.

The compound exhibits activity with regard to inhibition of inflammatory edema formation, inhibition of inflammatory neutrophilic polymorphonuclear leukocyte (PMN) infiltration, and pituitary gonadotrophin inhibition.

The p-(β-diethylaminoethylamino) - p'-methylbenzophenone was prepared as follows:

To a suspension of 146 grams (1.2 moles) of aluminum chloride in 500 milliliters of dry toluene was added slowly a solution of 185 grams (1 mole) of p-nitrobenzoyl chloride in 2 liters of carbon disulfide. After the addition was completed, the mixture was refluxed for three hours and then poured on ice. The carbon disulfide was removed at reduced pressure, and the solid product was dissolved in ether and dried over magnesium sulfate. The solution was concentrated and petroleum ether was added to precipitate p-nitro-p'-methylbenzophenone, melting at 118 to 122° C.

A mixture of 199 grams (0.826 mole) of p-nitro-p'-methylbenzophenone and 560 grams (2.48 moles) of stannous chloride dihydrate in 820 milliliters of concentrated hydrochloric acid and 820 milliliters of ethanol was stirred without external heating until the initial exothermic reaction had subsided and was then refluxed for one hour. The hot solution was slowly poured into a solution of 980 grams of sodium hydroxide in 1200 milliliters of water and 1500 milliliters of ethanol. The mixture was cooled, filtered, and the solid product was washed with water. The product was recrystallized from ethyl acetate to yield p-amino-p'-methylbenzophenone, melting at 182 to 184° C.

A mixture of 165 grams (0.78 mole) of p-amino-p'-methylbenzophenone, 102 grams (1 mole) acetic anhydride, and 121 grams (1.2 moles) triethylamine in 350 milliliters of dry benzene was refluxed for two hours and then poured on ice. The solid was removed by filtration, washed first with a solution of sodium bicarbonate, and then with cold ether. Recrystallization from acetonitrile gave p-acetamido-p'-methylbenzophenone, melting at 159 to 161° C.

A dispersion of sodium hydride in paraffin, containing 12.6 grams (0.524 mole) of sodium hydride, was slowly added to a solution of 132.5 grams (0.524 mole) of p-acetamido-p'-methylbenzophenone in 1500 milliliters of dry acetone, and the mixture was refluxed for thirty minutes. To the resulting suspension was added 71.3 grames (0.524 mole) of β-diethylaminoethyl chloride, and the mixture was refluxed for two hours. The reaction mixture was cooled, filtered, and the acetone was removed by distillation. The residue was dissolved in ether, washed with water, and extracted with 200 milliliters of concentrated hydrochloric acid in 800 milliliters of water. The acid extracts were heated on a steam bath for eight hours, cooled, made basic with sodium hydroxide, and extracted with ether. After drying the ether extracts over magnesium sulfate, a butanone solution containing 45 grams (0.5 mole) of oxalic acid was added. The resulting solid was recrystallized from methanol-butanone to give p-(β-diethylaminoethylamino)-p'-methylbenzophenone acid oxalate, melting at 158 to 160° C.

*Example II.—1-[p-(β-diethylaminoethylamino)phenyl]-1-phenyl-2-(p-methoxyphenyl)ethanol*

When p-(β-diethylaminoethylamino)-p'-methylbenzophenone was replaced with p-(β-diethylaminoethylamino)benzophenone and p - chlorobenzylmagnesium chloride was replaced with p-methoxybenzylmagnesium chloride in the procedure of Example I, 1-[p-(β-diethylaminoethylamino)phenyl] - 1 - phenyl-2-(p-methoxyphenyl)ethanol was obtained, melting point 120 to 122° C.

Using the procedures of Example I, commercial grade p-aminobenzophenone was acetyled to give p-acetamidobenzophenone, melting point 153 to 155° C., then alkylated with β-diethylaminoethyl chloride, and hydrolyzed with dilute hydrochloric acid to yield p-(β-diethylaminoethylamino)benzophenone, melting point 151 to 154° C., as its acid oxalate salt.

This compound is uterotrophic, and is an estrogen antagonist.

*Example III.—1-[p-(β-diethylaminoethylamino)phenyl]-1-(p-tolyl)-2-phenylethanol*

When p-chlorobenzylmagnesium chloride was replaced with benzylmagnesium chloride in the procedure of Example I, 1-[p-(β-diethylaminoethylamino)phenyl]-1-(p-tolyl)-2-phenylethanol was obtained, melting point 74 to 76° C.

This compound exhibits activities of inhibition of inflammatory granuloma, uterotrophism, and estrogen antagonism.

*Example IV.—1-[p-(β-diethylaminoethylamino)phenyl]-1-(p-tolyl)-2-(m-trifluoromethylphenyl)ethanol*

When p-chlorobenzylmagnesium chloride was replaced by m-trifluoromethylbenzylmagnesium chloride in the procedure of Example I, 1-[p-(β-diethylaminoethylamino)-phenyl]-1-(p-tolyl)-2-(m-trifluoromethylphenyl)ethanol was obtained.

*Example V.—1-[(β-diethylaminoethylamino)phenyl]-1-(p-tolyl)-2-(p-chlorophenyl)ethylene*

To an ethanol solution of 12.3 grams (0.028 mole) of 1-[p-(β-diethylaminoethylamino)phenyl] - 1 - (p-tolyl)-2-(p-chlorophenyl)ethanol was added an excess of concentrated hydrochloric acid and the solution was refluxed for a period of four hours. The ethanol was removed under reduced pressure, and the residue was made basic with 10 percent sodium hydroxide. The free amine was extracted with ether and dried over magnesium sulfate. A butanone solution containing 4.8 grams (0.025 mole) of citric acid was added to the ether solution of the amine and the crystalline salt was removed by filtration. The product was recrystallized twice from butanone to yield 1-[p-(β-diethylaminoethylamino)phenyl] - 1 - (p-tolyl)-2-(p-chlorophenyl)ethylene dihydrogen citrate, melting point 116 to 118° C.

This compound exhibits activity with regard to inhibition of inflammatory neutrophilic polymorphonuclear leukocyte (PMN) infiltration.

*Example VI—1-[p-(β-diethylaminoethylamino)phenyl]-1-phenyl-2-(p-methoxyphenyl)ethylene*

When 1 - [p-(β-diethylaminoethylamino)phenyl]-1-phenyl-2-(p-methoxyphenyl)ethanol was treated with acid as in Example V, 1-[p-(β-diethylaminoethylamino)phenyl] - 1-phenyl-2-(p-methoxyphenyl)ethylene dihydrogen citrate was obtained, melting point 101 to 103° C.

This compound exhibits activities with regard to inhibition of inflammatory edema formation, inhibition of inflammatory granuloma formation, inhibition of inflammatory neutrophilic polymorphonuclear leukocyte (PMN) infiltration, uterotrophism, estrogen antagonsim, and pituitary gonadotrophin inhibition.

*Example VII.—1-[p-(β-diethylaminoethylamino)phenyl]-1-(p-tolyl)-2-phenylethylene*

When 1 - [p-(β-diethylaminoethylamino)phenyl]-1-(p-tolyl)-2-phenylethanol was treated with acid as in Example V, 1-[p-(β-diethylaminoethylamino)phenyl]-1-(p-tolyl)-2-phenylethylene dihydrogen citrate, melting in the range 102 to 110° C., was obtained.

This ethylene compound was separated into its geometrical isomers by chromatography of the free base on a column of activated alumina. Elution with methylene chloride yielded one of the isomers which, when converted to its dihydrogen citrate salt, melted at 102 to 104° C. Continued elution with methylene chloride yielded first a mixture of the two isomers and finally a small amount of the second isomer. Ether readily removed the second isomer which melted at 127 to 131° C. when converted to the dihydrogen citrate salt.

This compound exhibits estrogen antagonism activity.

*Example VIII.—1-[p-(β-diethylaminoethylamino)phenyl]-1-(p-tolyl)-2-(m-trifluoromethylphenyl)ethylene*

When 1-[p - (β-diethylaminoethylamino)phenyl]-1-(p-tolyl)-2-(m-trifluoromethylphenyl)ethanol is treated with acid in the manner of Example V, 1-[p-(β-diethylaminoethylamino)phenyl]-1-(p - tolyl)-2-(m - trifluoromethylphenyl)ethylene is obtained.

*Example IX.—1-[p-(β-diethylaminoethylamino)phenyl]-1-(p-tolyl)-2-phenylethane*

A mixture of 9.6 grams (0.017 mole) of 1-[p-(β-diethylaminoethylamino)phenyl] - 1 - (p - tolyl)-2-phenylethylene dihydrogen citrate and 1 gram of 10 percent palladium-on-charcoal in 300 milliliters of ethanol was hydrogenated at 3 atmospheres pressure until the uptake of hydrogen ceased. The catalyst was removed by filtration, and the solution was concentrated. On cooling, 1-[p-(β-diethylaminoethylamino)phenyl] - 1 - (p-tolyl)-2 - phenylethane dihydrogen citrate separated, melting point 140 to 142° C.

*Example X.—1-[p-(β-diethylaminoethylamino)phenyl]-1-phenyl-2-(p-methoxyphenyl)ethane*

When 1-[p - (β-diethylaminoethylamino)phenyl]-1-(p-tolyl)-2-phenylethylene dihydrogen citrate was replaced with 1 - [p-(β-diethylaminoethylamino)phenyl]-1-phenyl-2-(p-methoxyphenyl)ethylene in the procedure of Example IX, 1 - [p - (β - diethylaminoethylamino)phenyl]-1-phenyl - 2 - (p-methoxyphenyl)ethane dihydrogen citrate was obtained, melting point 153 to 155° C.

This compound exhibits uterotrophic and estrogen antagonism activities.

*Example XI.—1-[p-(β-diethylaminoethylamino)phenyl]-1-(p-tolyl)-2-(p-chlorophenyl)ethane*

In the manner of Example IX, hydrogenation of 1-[p-(β-diethylaminoethylamino)phenyl] - 1 - (p-tolyl)-2-(p-chlorophenyl)ethylene yields 1-[p-(β-diethylaminoethylamino)phenyl]-1-(p-tolyl)-2-(p-chlorophenyl)ethane.

*Example XII.—1-[p-(β-diethylaminoethylamino)phenyl]-1-(p-tolyl)-2-(m-trifluoromethylphenyl)ethane*

In the manner of Example IX, hydrogenation of 1-[p-(β-diethylaminoethylamino)phenyl] - 1 - (p-tolyl)-2-(m-trifluoromethylphenyl)ethylene yields 1 - [p - (β-diethylaminoethylamino)phenyl] - 1 - (p-tolyl)-2-(m-trifluoromethylphenyl)ethane.

What is claimed is:

1. Compounds of the formula:

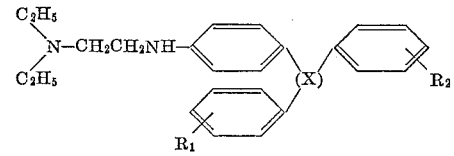

wherein $R^1$ and $R^2$ are selected from the group consisting of hydrogen, chlorine, lower alkyl, lower alkoxy, and trifluoromethyl, with the proviso that at least one of $R^1$ and $R^2$ is other than hydrogen; and X is selected from the group consisting of ethanol

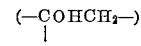

ethylene

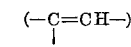

and ethane

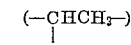

radicals.

2. 1 - [p-(β-diethylaminoethylamino)phenyl] - 1 - (p-tolyl)-2-(p-chlorophenyl)ethanol.

3. 1 - [p - (β - diethylaminoethylamino)phenyl] - 1-phenyl-2-(p-methoxyphenyl)ethanol.

4. 1 - [p - (β - diethylaminoethylamino)phenyl] - 1-(p-tolyl)-2-phenylethanol.

5. 1 - [p - (β - diethylaminoethylamino)phenyl] - 1-(p-tolyl)-2-(m-trifluoromethylphenyl)ethanol.

6. 1 - [p - (β - diethylaminoethylamino)phenyl] - 1-(p-tolyl)-2-(p-chlorophenyl)ethylene.

7. 1 - [p - (β - diethylaminoethylamino)phenyl] - 1-phenyl-2-(p-methoxyphenyl)ethylene.

8. 1 - [p - (β - diethylaminoethylamino)phenyl] - 1-(p-tolyl)-2-phenylethylene.

9. 1 - [p - (β - diethylaminoethylamino)phenyl] - 1-(p-tolyl)-2-(m-trifluoromethylphenyl)ethylene.

10. 1 - [p - (β - diethylaminoethylamino)phenyl] - 1-(p-tolyl)-2-phenylethane.

11. 1 - [p - (β - diethylaminoethylamino)phenyl] - 1-phenyl-2-(p-methoxyphenyl)ethane.

12. 1 - [p - (β - diethylaminoethylamino)phenyl] - 1-(p-tolyl)-2-(p-chlorophenyl)ethane.

13. 1 - [p - (β - diethylaminoethylamino)phenyl] - 1-(p-tolyl)-2-(m-trifluoromethylphenyl)ethane.

References Cited by the Examiner

UNITED STATES PATENTS

| 2,455,949 | 12/1948 | Rieveschi | 260—570 |
| 2,483,434 | 10/1949 | Rieveschi | 260—570 X |
| 2,483,435 | 10/1949 | Rieveschi | 260—570 |
| 2,483,436 | 10/1949 | Rieveschi | 260—570 X |
| 2,865,911 | 12/1958 | Nielsen et al. | 260—570.7 X |
| 2,914,561 | 11/1959 | Allen et al. | 260—570 |
| 2,914,562 | 11/1959 | Allen et al. | 260—570 |
| 2,914,563 | 11/1959 | Allen et al. | 260—570 |
| 2,914,564 | 11/1959 | Allen et al. | 260—570 |
| 2,971,001 | 2/1961 | Palopoli et al. | 260—570 X |
| 3,123,643 | 3/1964 | Palopoli et al. | 260—570 |

OTHER REFERENCES

Armstrong et al., "Proceedings Soc. for Exptl. Biol. and Med.," vol. 113, No. 4, pages 960–3 (1963).

Burger, "Medicinal Chemistry," 2nd Ed., pages 599–60 (1960).

CHARLES B. PARKER, *Primary Examiner.*